United States Patent [19]

Le Brasseur

[11] 4,420,417

[45] Dec. 13, 1983

[54] ETHYLENE POLYMERIZATION CATALYST AND A PROCESS FOR ITS PREPARATION

[75] Inventor: Genevieve Le Brasseur, Bully les Mines, France

[73] Assignee: Societe Chimique des Charbonnages-CdF Chimie, Paris, France

[21] Appl. No.: 403,067

[22] Filed: Jul. 29, 1982

[30] Foreign Application Priority Data

Jul. 30, 1981 [FR] France .................................. 81 14813

[51] Int. Cl.$^3$ ................................................ C08F 4/64
[52] U.S. Cl. .................................. 502/169; 502/154; 526/124; 526/125
[58] Field of Search ......................... 252/429 B, 429 C

[56] References Cited

U.S. PATENT DOCUMENTS

| | | | |
|---|---|---|---|
| 3,094,568 | 6/1963 | Hay et al. | 252/429 B X |
| 4,115,319 | 9/1978 | Scata et al. | 252/429 B |
| 4,218,339 | 8/1980 | Zucchini et al. | 252/429 B |
| 4,311,612 | 1/1982 | Boone et al. | 252/429 C X |

*Primary Examiner*—Patrick Garvin
*Attorney, Agent, or Firm*—Finnegan, Henderson, Farabow, Garrett & Dunner

[57] ABSTRACT

An ethylene polymerization catalyst having the general formula $M_n Mg(OR)_{2+4n-m} X_m$, wherein R is an alkyl radical containing from 1 to 4 carbon atoms, M is a transition metal of groups IVa to VIa of the Periodic Table, X is a halogen, $0.05 \leq n \leq 0.6$ and $0 < m < n+1$.

8 Claims, No Drawings

ETHYLENE POLYMERIZATION CATALYST AND A PROCESS FOR ITS PREPARATION

BACKGROUND OF THE INVENTION

The present invention relates to catalysts for the polymerization of olefins, and more particularly to ethylene polymers, and to a process for their preparation.

French Pat. No. 2,324,652 describes a process for the preparation of an olefin polymerization catalyst in which a titanium compound is brought into contact with the solid halogenation product obtained by reacting an organic acid halide with a magnesium alcoholate with the atomic ratio of halogen/Mg+Ti being greater than 2. The halogenation product contains a Lewis base, for example, the ester formed by reacting the organic acid halide with the magnesium alcoholate. The titanium compound is added during the reaction of the magnesium alcoholate with the organic acid halide and the atomic ratio of Ti/Mg is greater than 1.

It has now been discovered that if the atomic ratio of halogen/Mg+M is less than 1 during the reaction of an organic acid halide with a mixture of a magnesium alcoholate and a transition metal (M) alcoholate, with the ratio of M/Mg in the catalyst obtained being equal to, at most 0.6 and without the ester formed by reacting the organic acid halide with the mixture of alcoholates in the catalyst formed, that a catalyst can be obtained having markedly improved activity.

Accordingly, an object of this invention is to provide a new and improved catalyst for the polymerization of olefins, and more particularly ethylene, having greater activity than known prior art catalysts.

Yet another object of this invention is to provide a process for the preparation of these catalysts.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects and in accordance with the purposes of the invention, as embodied and broadly described herein, the invention comprises a catalyst for the homopolymerization of ethylene and the copolymerization of ethylene with α-olefins having the general formula $$M_nMg(OR)_{2+4n-m}X_m$$

in which R is an alkyl radical containing from 1 to 4 carbon atoms, X is at least one halogen, M is at least one transition metal selected from the group consisting of the metals of groups IVa to VIa of the Periodic Table, $0.05 \leq n \leq 0.6$, and $0 < m < n+1$.

DESCRIPTION OF THE PREFERRED EMBODIMENTS

Reference will now be made in detail to the presently preferred embodiments of the invention.

Preferably, the transition metal, M, is titanium, vanadium, zirconium, chromium or a mixture of these metals. If M is a mixture, then the index n applies to the sum of the different metal atoms. The halogen, X, may be fluorine, chlorine, bromine, iodine or a mixture of these elements. Again, in this last case, the index m applies to the sum of the different halogen atoms.

In accordance with a preferred embodiment of this invention, the transition metal M is titanium or vanadium, and the halogen X is chlorine.

The invention further provides a process for the preparation of these catalysts which comprises:

(a) immersing a magnesium alcoholate, $Mg(OR)_2$, in an inert solvent and adding at least one transition metal alcoholate, $M(OR)_y$, in which R in both cases is an alkyl radical containing 1 to 4 carbon atoms, Y is the maximum valency of the metal M and wherein the respective amounts of each of the alcoholates is such that the atomic ratio M/Mg is between 0.05 and 0.6. The temperature should be between 20° C. and the boiling point of the inert solvent, and the reaction time between 1 and 6 hours;

(b) adding to the reaction mixture of step (a) at least one organic acid halide R'COX, wherein R' is an alkyl radical containing from 1 to 12 carbon atoms, at a temperature of between 0° and 30° C. and in an amount such that the atomic ratio X/Mg+M is less than 1;

(c) heating the reaction mixture of step (b) at a temperature between 30° C. and the boiling point of the inert solvent for a period such that the liquid phase of the reaction mixture no longer contains either halogen or transition metal in solution; and (d) removing the alkyl ester, R'COOR, formed.

The magnesium alcoholate, $Mg(OR)_2$, and transition metal alcoholate, $M(OR)_y$, are preferably selected from the group consisting of magnesium and transition metal methylates, ethylates, n-propylates, and isopropylates. The radicals, R, of the magnesium alcoholate and the transition metal alcoholate, need not be indentical. Exemplary of suitable alcoholates are magnesium ethylate and titanium ethylate.

The halogen of the organic acid halide R'COX used in step (b) can be selected from the group consisting of fluorine, chlorine, bromine and iodine but clorine is preferred. Exemplary of a suitable acid halide is acetylchloride, $CH_3COCl$.

The inert solvent is selected from the group consisting of saturated aliphatic and cycloaliphatic hydrocarbons, such as hexane, heptane, octane and their branched or unbranched cyclic isomers. Preferably, the solvent has a boiling point above that of the ester or esters, R'COOR, formed during the reaction of the organic acid halide with the mixture of alcoholates. Thus, the ester or esters may be removed by distillation, while the solvent remains in the reaction medium.

The organic acid halide is preferably diluted in a solvent, for example a solvent identical to that used in step (a), before being added to the mixture of alcoholates. Step (c) is generally completed in 1 to 3 hours.

The alkyl ester formed may be removed by washing the resulting product with a solvent. Advantageously, the ester may be removed by distillation, under reduced pressure, if appropriate.

The catalysts of the invention are very useful for the polymerization of olefins, and in particular ethylene, when they form part of catalytic systems additionally comprising at least one activator selected from the group consisting of the hydrides and the organometallic compounds of the metals of groups I to III of the Periodic Table. The atomic ratio of the metal in the activator to the transition metal in the catalyst should be between 0.1 and 100. More particularly, the activators are selected from the group consisting of trialkylaluminiums, halogenodialkylaluminiums, alkylsiloxalanes (such as those described in French Pat. No. 2,324,652) and alkylaluminoxanes.

The catalysts may be activated in situ in the polymerization reactor or beforehand. In the latter case, the activation is preferably carried out in two steps. First, the catalyst and the activator are brought into contact with one another at low temperature and generally in the presence of a solvent, such as a saturated aliphatic or cycloaliphatic hydrocarbon. The atomic ratio of the metal in the activator to the transition metal in the catalyst should be between 0.2 and 10. Preferably, the product obtained is then stabilized with the aid of an unsaturated hydrocarbon containing, for example, from 6 to 12 carbon atoms. The molar ratio of the hydrocarbon to the transition metal should be between 1 to 10. Second, the remainder of the activator is added to the preactivated catalyst, either prior to the polymerization or in the polymerization reactor.

The invention also relates to the use of the catalysts for the polymerization of olefins and more particularly for the polymerization of ethylene. In this process, the homopolymerization of ethylene or the copolymerization of ethylene with α-olefins having from 3 to 8 carbon atoms is carried out at a temperature between 20° and 350° C., under a pressure between 1 and 2,500 bars and in the presence of the catalyst system described above.

More particularly, low pressure polymerization or the copolymerization is carried out at a temperature between 20° and 200° C., under a pressure between 1 and 200 bars, and in solution or in suspension in an inert liquid hydrocarbon having at least 6 carbon atoms.

High pressure polymerization or the copolymerization can be carried out at a temperature between 180° and 350° C. and under a pressure between 400 and 2,500 bars. The average residence time of the catalyst system in the polymerization reactor should be between 2 and 10 seconds. Further, the polymerization or the copolymerization can be carried out in the presence of a chain transfer agent, such as hydrogen, in an amount of up to 2 mol %.

The purpose of the following examples is to illustrate several embodiments of the present invention without implying a limitation.

EXAMPLES 1 TO 5—Preparation of the catalyst

In a reactor fitted with regulated heating and cooling means and with a stirrer, 114 g of magnesium ethylate and an amount of titanium ethylate, $Ti(OC_2H_5)_4$, as indicated in Table I below, in grams, are suspended in 600 ml of methylcyclohexane. The suspension is heated under reflux for 3 hours, with stirring.

Acetyl chloride, $CH_3COCl$, in an amount indicated in Table I below, in grams, diluted in 3 times its volume of methylcyclohexane, is then added to the reaction mixture at a temperature of 30° C. The reaction is continued by heating the reaction mixture at 40° C. for 3 hours. At this point, the solvent phase no longer contains either chlorine or titanium.

The ethyl acetate formed is then distilled under atmospheric pressure, and the methylcyclohexane carried away by this operation is replaced by adding fresh solvent. This gives a fine suspension having the appearance of a homogeneous cream.

This suspension is then used for the preparation of the catalytic systems. An aliquot is removed and dried for the elementary analyses making it possible to calculate the indices n and m/n+1 as shown in Table I.

TABLE I

| EXAMPLE | $Ti(OC_2H_5)_4$ (grams) | $CH_3COCl$ (grams) | n | m/n + 1 |
|---|---|---|---|---|
| 1 | 122 | 119 | 0.5 | 0.95 |
| 2 | 122 | 55 | 0.5 | 0.5 |
| 3 | 68.5 | 51 | 0.3 | 0.5 |
| 4 | 18.2 | 21 | 0.08 | 0.25 |
| 5 | 18.2 | 80.5 | 0.08 | 0.95 |

EXAMPLES 6 TO 10—Polymerization of ethylene under low pressure

The catalysts obtained in acordance with Examples 1 to 5 are activated, in suspension in the reaction medium of their preparation, with the aid of a solution of an equimolecular mixture of triethylaluminium and chlorodiethylaluminium in a solvent. The solution is added slowly so that the temperature does not exceed about 35° C. and in an amount such that the atomic ratio of Al/Ti+Mg is equal to 8.

The suspension obtained is stabilized with the aid of hexene in a molar ratio of hexene/Ti of 2, at a temperature of 30° C. and it constitutes the catalytic system.

600 ml of a saturated $C_{11}$-$C_{12}$ hydrocarbon fraction are then introduced into a steel autoclave reactor having a capacity of 1 liter, ethylene is then introduced up to saturation under a pressure of 6 bars and the suspension of catalytic system prepared beforehand is then introduced in an amount containing 0.1 milliatomgram of transition metal.

The polymerization of the ethylene is carried out at a temperature of 200° C. for a period of 1 minute, under a constant pressure of 6 bars of ethylene. The solution is then recovered and the polymer is filtered off at ambient temperature. The catalytic yield $Y_c$ of polyethylene obtained is shown in Table II, expressed in g/minute/milliatomgram of transition metal/mol of ethylene/liter.

TABLE II

| EXAMPLE | 6 | 7 | 8 | 9 | 10 |
|---|---|---|---|---|---|
| Catalyst Example No. | 1 | 2 | 3 | 4 | 5 |
| $Y_c$ | 1,130 | 1,150 | 1,520 | 2,490 | 1,600 |

EXAMPLES 11 TO 15—Polymerization of ethylene under high pressure

The catalysts obtained in accordance with example 1 to 5 are preactivated, in suspension in the reaction medium of their preparation, with the aid of a solution of an equimolecular mixture of triethylaluminium and chlorodiethylaluminium in a solvent. The solution is added slowly so that the temperature does not exceed about 35° C. and in an amount such that the atomic ratio Al/Ti+Mg is equal to 6.

The suspension obtained is stabilized with the aid of hexene, at a temperature of 30° C., in a molar ratio of hexene/Ti of 5, and it comprises the catalytic system.

In these Examples, the continuous polymerization of ethylene is carried out under a pressure of 800 bars, in an autoclave reactor having a volume of 0.6 liters and kept at a temperature of 230° C. The dispersion of the catalytic system is injected at a rate such that the average residence time of the catalyst in the reactor is about 30 seconds. The flow rate of ethylene is 10 kg/hour and the flow rate of the suspension of the catalytic system is 4 liters/hour. The polymerization is carried out in the presence of hydrogen in the proportion by volume indicated in Table III below.

The catalytic yield $Y_c$ of the polyethylene obtained is set forth in Table III, expressed in kg/milliatomgram of transition metal. Its weight-average molecular weight, Mw, and its number-average molecular weight, Mn, are measured by gel permeation chromatography. Its melt index (MI), according to ASTM Standard Specification D 1238-73, is expressed in dg/minute. The ratio Mw/Mn is the polydispersity index.

TABLE III

| EX-AMPLE | CATALYST EXAMPLE NO. | $H_2$, % | $Y_c$ | Mn | Mw/Mn | MI |
|---|---|---|---|---|---|---|
| 11 | 1 | 0.2 | 5.1 | 10,800 | 8.4 | 15 |
| 12 | 2 | 0.1 | 6.7 | 17,000 | 5.5 | 6.8 |
| 13 | 3 | 0.1 | 8.6 | 19,400 | 5.4 | 2.9 |
| 14 | 4 | 0.1 | 15.0 | 22,100 | 3.7 | 9.4 |
| 15 | 5 | 0.1 | 12.0 | 13,600 | 4.6 | 19 |

EXAMPLE 16—Polymerization of ethylene under high pressure in a multizone reactor Ethylene is polymerized continuously under a pressure of 1,000 bars in a vertical cylindrical reactor having a volume of 3 liters and divided internally by metal screens into 3 reaction zones operating at different temperatures (zone 1, 200° C.; zone 2, 230° C.; zone 3, 280° C.).

The catalytic system is injected into zone no. 1 at a concentration of 1 milliatomgram of titanium per liter and into zone no. 3 at a concentration of 1.5 milliatomgrams of titanium per liter.

The catalytic system consists of a catalyst prepared under the conditions of Example 1, except that titanium isopropylate replaces titanium ethylate prepolymerized by hex-1-ene in a molar ratio of hex-1-ene/Ti of 2 and then activated by dimethylethyldiethylsiloxalane added in an amount such that the atomic ratio Al/Ti is equal to 3. The polymerization is carried out in the presence of 10% by volume of propane.

This procedure yields an ethylene polymer with a catalytic yield equal to 7.2 kg/milliatomgram of titanium. Its characteristics are as follows:

| MI = 0.6 dg/minute | density, $\rho$ = 0.950 g/cm³ |
|---|---|
| Mn = 13,600 | Mw/Mn = 9 |

EXAMPLE 17—Copolymerization of ethylene and 1-butene

In the reactor used in Example 16 and under the same pressure conditions, a mixture comprising 40% of 1-butene and 60% of ethylene is copolymerized with the aid of a catalytic system prepared from the catalyst of Example 2, activated in an atomic ratio Al/Ti of 8 with the aid of a mixture comprising 1 part of Al(C₂H₅)₃ per 3 parts of Al(C₂H₅)₂Cl. The three reaction zones operate at temperatures of 210° C. (zone 1), 170° C. (zone 2) and 250° C. (zone 3).

This gives an ethylene/1-butene copolymer with a catalytic yield of 10 kg/milliatomgram of Ti having the following characteristics:

| MI = 2.5 dg/minute | density, $\rho$ = 0.930 g/cm³ |
|---|---|
| Mn = 32,800 | Mw/Mn = 3.7 |

The polymerization process according to the invention, illustrated in particular by the above Examples, thus makes it possible to obtain polymers having a density $\rho$ of between 0.91 and 0.97 g/cm³ and a melt index MI of between 0.2 and 20 dg/minute.

It will be apparent to those skilled in the art that various modifications and variations can be made in compositions and processes of the invention without departing from the scope or spirit of the invention.

What is claimed is:

1. A catalyst for polymerization of ethylene having the general formula:

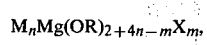

wherein X is at least one halogen, M is at least one transition metal selected from the group consisting of the metals of groups IVa to VIa of the Periodic Table, R is an alkyl radical containing from 1 to 4 carbon atoms, $0.05 \leq n \leq 0.6$ and $0 < m < n+1$.

2. The catalyst of claim 1, wherein the transition metal M is selected from the group consisting of titanium and vanadium.

3. The catalyst of claim 1, wherein the halogen X is selected from the group consisting of chlorine, bromine, iodine, fluorine or a mixture thereof.

4. The catalyst of claim 1 wherein M is titanium, X is chlorine and R is ethyl.

5. A process for the preparation of the catalyst of claim 1, comprising:

(a) immersing a magnesium alcoholate, Mg(OR)₂, in an inert solvent and adding at least one transition metal alcoholate M(OR)$_y$, in which y is the maximum valency of the metal M and wherein the respective amounts of each of the alcoholates is such that the atomic ratio M/Mg is between 0.05 and 0.6, at a temperature of between 20° C. and the boiling point of the inert solvent for a period of between 1 and 6 hours;

(b) adding at least one organic acid halide R'COX wherein R' is an alkyl radical containing from 1 to 12 carbon atoms and X is a halogen selected from the group consisting of chlorine, bromine, iodine and fluorine to the reaction mixture of step (a) at a temperature of between 0° and 30° C. in an amount such that the atomic ratio X/Mg+M is less than b 1;

(c) heating the reaction mixture of step (b) at a temperature between 30° C. and the boiling point of the inert solvent for a period such that the liquid phase of the reaction mixture no longer contains either halogen or transition metal in solution; and (d) removing alkyl ester, R'COOR, formed.

6. The process of claim 5, wherein the halogen X is chlorine.

7. A catalytic system for the homopolymerization of ethylene and the copolymerization of ethylene with α-olefins that comprises the catalyst of claim 1 and at least one activator selected from the group consisting of the hydrides and the organometallic compounds of the metals of groups I to III of the Periodic Table, wherein the atomic ratio of the metal in the activator to the transition metal in the catalyst is between 0.1 and 100.

8. The catalyst system of claim 5, wherein the activator is ethylaluminium sesquichloride.

* * * * *

UNITED STATES PATENT AND TRADEMARK OFFICE
CERTIFICATE OF CORRECTION

PATENT NO. : 4,420,417
DATED : December 13, 1983
INVENTOR(S) : Genevieve Le Brasseur It is certified that error appears in the above—identified patent and that said Letters Patent is hereby corrected as shown below:

Column 6, line 66, change "claim 5" to --claim 7--.

Signed and Sealed this

Twentieth Day of November 1984

[SEAL]

Attest:

GERALD J. MOSSINGHOFF

Attesting Officer

Commissioner of Patents and Trademarks